(12) United States Patent
O'Donnell

(10) Patent No.: US 10,582,697 B2
(45) Date of Patent: Mar. 10, 2020

(54) OLFACTORY MAT FOR DOMESTIC ANIMALS

(71) Applicant: Clear-Coat Holding Company, Philadelphia, PA (US)

(72) Inventor: Dennis P. O'Donnell, Philadelphia, PA (US)

(73) Assignee: CURIO HOLDING COMPANY, Philadelphia, PA (US)

( * ) Notice: Subject to any disclaimer, the term of this patent is extended or adjusted under 35 U.S.C. 154(b) by 480 days.

(21) Appl. No.: 15/383,964

(22) Filed: Dec. 19, 2016

(65) Prior Publication Data

US 2018/0027773 A1    Feb. 1, 2018

Related U.S. Application Data

(60) Provisional application No. 62/366,974, filed on Jul. 26, 2016.

(51) Int. Cl.
| | | |
|---|---|---|
| *D06N 7/00* | (2006.01) | |
| *A01K 15/02* | (2006.01) | |
| *B32B 3/02* | (2006.01) | |
| *D04H 11/00* | (2006.01) | |

(52) U.S. Cl.
CPC ......... *A01K 15/025* (2013.01); *D06N 7/0065* (2013.01); *B32B 3/02* (2013.01); *D04H 11/00* (2013.01); *D06N 2211/066* (2013.01)

(58) Field of Classification Search
CPC ...... A01K 29/00; A01K 1/0107; A01K 1/033; A01K 15/025; D06N 7/0092; D06N 7/0065; A47G 27/0412; B32B 3/02; D04H 11/00

USPC .......................................... 119/28.5; 428/92
See application file for complete search history.

(56) References Cited

U.S. PATENT DOCUMENTS

| | | | | |
|---|---|---|---|---|
| 2,048,413 | A | * | 7/1936 | Basilia .................. D05C 12/00 112/1 |
| 2,318,345 | A | * | 5/1943 | Wadely .................. D03D 27/00 139/391 |
| 3,267,679 | A | | 8/1966 | Morse |
| 3,332,828 | A | | 7/1967 | Faria et al. |
| 4,201,806 | A | | 5/1980 | Cole |
| 4,254,181 | A | | 3/1981 | Bromley et al. |

(Continued)

OTHER PUBLICATIONS

What is a Snuffelmat? For Smart Dogs: De Snuffelmat; http://www.snuffelmat.nl/en_GB/; 2014-2016.

(Continued)

*Primary Examiner* — Yvonne R Abbott-Lewis
*Assistant Examiner* — Yvonne Abbott
(74) *Attorney, Agent, or Firm* — The Belles Group, P.C.

(57) ABSTRACT

A washable, reusable mat that serves as a stimulation device for animals, the mat having a base a base with a pile thereon, the pile being formed from a plurality of fingers which are arranged to form a structure with a plurality of spaces. Food or treats for the animal (e.g., a dog), are placed on the mat, and the food or treats fall among the fingers and are captured within the spaces formed in the pile by the fingers. The animal locates the food or treats by employing the animal's olfactory senses, such as smell and taste, to locate the food within the matt pile. The animal may use its nose (or paws) to gain access to the captured food by tunneling among the fingers, moving the fingers aside, or other action to access the hidden food.

22 Claims, 4 Drawing Sheets

(56) References Cited

U.S. PATENT DOCUMENTS

| | | | |
|---|---|---|---|
| 4,337,283 A * | 6/1982 | Haas, Jr. | E01C 13/08 |
| | | | 428/17 |
| 4,605,580 A * | 8/1986 | Goolsby | D06N 7/0092 |
| | | | 156/72 |
| 4,617,208 A * | 10/1986 | Cadenhead, Sr. | D02G 1/002 |
| | | | 428/17 |
| 4,811,989 A * | 3/1989 | Quearry | A47L 13/20 |
| | | | 300/21 |
| D301,668 S * | 6/1989 | Smith | D6/583 |
| D315,321 S | 3/1991 | Aoyama | |
| D317,489 S | 6/1991 | Stillinger | |
| 5,109,796 A | 5/1992 | Monus | |
| 5,380,574 A * | 1/1995 | Katoh | A47G 27/0412 |
| | | | 428/92 |
| 5,458,944 A * | 10/1995 | Austin | B32B 5/04 |
| | | | 428/95 |
| 5,462,778 A * | 10/1995 | Ishikawa | D01D 5/253 |
| | | | 425/72.2 |
| 5,640,931 A | 6/1997 | Markham | |
| 6,196,156 B1 * | 3/2001 | Denesuk | A01K 1/0152 |
| | | | 119/28.5 |
| 6,203,636 B1 * | 3/2001 | Popper | A47G 27/0243 |
| | | | 156/166 |
| D454,236 S | 3/2002 | Kaplan | |
| 6,367,398 B1 * | 4/2002 | Landau | D05C 17/026 |
| | | | 112/410 |
| D478,705 S | 8/2003 | Dahl et al. | |
| 6,645,538 B2 | 11/2003 | Best et al. | |
| 6,723,413 B2 * | 4/2004 | Walters | D06N 7/0084 |
| | | | 156/72 |
| D503,507 S | 4/2005 | Jia et al. | |
| D522,211 S | 6/2006 | Zhang et al. | |
| D530,482 S | 10/2006 | Zhang et al. | |
| 7,146,934 B1 | 12/2006 | Staley | |
| D537,131 S | 2/2007 | Chernick et al. | |
| D560,868 S | 1/2008 | So | |
| D562,515 S | 2/2008 | Treacy | |
| D564,716 S | 3/2008 | Lamstein | |
| D589,221 S | 3/2009 | Wada et al. | |
| D607,081 S | 12/2009 | Harper et al. | |
| D607,082 S | 12/2009 | Harper et al. | |
| D610,320 S | 2/2010 | Wada et al. | |
| D614,831 S | 5/2010 | Bardiani et al. | |
| D638,595 S | 5/2011 | Kaminer et al. | |
| D671,700 S | 11/2012 | Patterson | |
| D681,294 S | 4/2013 | Yamada | |
| D695,479 S | 12/2013 | Sgroi, Jr. et al. | |
| D746,528 S | 12/2015 | Lentine | |
| D750,995 S | 3/2016 | Mitchell | |
| D751,995 S | 3/2016 | Masters et al. | |
| D770,714 S | 11/2016 | Troger | |
| D771,337 S | 11/2016 | Gradie | |
| D773,767 S | 12/2016 | Troger | |
| D773,768 S | 12/2016 | Troger | |
| D782,141 S | 3/2017 | Troger | |
| D782,142 S | 3/2017 | Troger | |
| D793,650 S | 8/2017 | Herrenbruck | |
| 2006/0081195 A1 | 4/2006 | Jiang | |
| 2009/0241852 A1 | 10/2009 | Stevens | |
| 2011/0277696 A1 | 11/2011 | Rutherford et al. | |
| 2012/0060766 A1 | 3/2012 | Brandon | |
| 2012/0064263 A1 | 3/2012 | Ayers et al. | |
| 2014/0103613 A1 | 4/2014 | Gomez | |
| 2015/0024150 A1 | 1/2015 | Vachon et al. | |
| 2015/0191879 A1 | 7/2015 | Meuleman et al. | |
| 2016/0255812 A1 | 9/2016 | Wolfe, Jr. | |
| 2016/0330935 A1 | 11/2016 | Vesterholt | |

OTHER PUBLICATIONS

*What is a Snuffelmat? For Smart Dogs: De Snuffelmat*, http://www.snuffelmatnl/en_GB/, 2014-2019, pp. 1-3.

*Snuffelmat*, Google Search, Jun. 23, 2016, pp. 1-15 (with images appearing on the first four pages).

*Snuffelmat*, Google Search, Sep. 30, 2016, pp. 1-5.

Sarada, *7.Rummage mats—Sarada*: http://www.sarada.nl/nl/category/snuffelmatten/#prettyPhoto [gallery_110]/0/, Jun. 23, 2016.

Edible Birds Nest, https://iambaker.net/edible-birds-nest-tutorial/, Feb. 2010, pp. 1.

Pixabay Cinnamon sticks photo, http://pixabay.com/en/cinnamon-stick-cinnamon-powder-spice-514243/, Nov. 2014, pp. 1.

DIY Shag Rug Tutorial, announced Jun. 16, 2016, [YouTube]. Available from internet, URL: https://www.youtube.com/watch?v=GqTN1kycH1A.

*Upcycled T-shirt Rug Tutorial*, at pinterest.com announced Oct. 22, 2014, URL: https://www.pinterest.com/pin/21532904438688407.

Toni Anderson; *Upcycled T-Shirt Rug Tutorial*, The Happy Housewife, Mar. 15, 2012, URL: https://thehappyhousewife.com/home-management/upcycled-t-shirt-rug-tutorial/.

\* cited by examiner

OLFACTORY MAT FOR DOMESTIC ANIMALS

CROSS-REFERENCE TO RELATED APPLICATIONS

This patent application claims the benefit under 35 U.S.C. 119 and 35 U.S.C. 120 of U.S. provisional application Ser. No. 62/366,974 entitled "Olfactory Mat for Domestic Animals", filed Jul. 26, 2016, the complete contents of which is herein incorporated by reference.

BACKGROUND OF THE INVENTION

1. Field of the Invention

The invention relates to devices for animals, and in particular, devices for animals that are designed to stimulate the animal's senses, and, in particular, the olfactory senses. The devices provide a way for an animal, such as a dog, to engage in activity by where the animal uses its senses to locate and obtain food or treats that are located within the device.

2. Brief Description of the Related Art

Non-domestic animals typically spend most of their time foraging for food. In contrast, pets engage in eating, which usually does not demand much time, and as a result, eating becomes an activity that provides little stimulation for the animal. Stimulation of animals kept as pets in the home, or in shelters or other controlled environments, has been attempted to reduce boredom and undesirable behavior that may result as a consequence of the animal needing to be active. A number of toys are produced and sold which are intended to occupy the animal by providing an activity that will engage the animal. Some toys have sound, clicking, lights or other responsive components. A number of different sizes and shapes of toys are available. There are also products which have been designed to require engagement of the animal in order to obtain food. These products typically are referred to as enrichment products. Enrichment products typically encompass the categories of manipulation and mealtime. A typical enrichment device captivates food and limits its distribution to the animal by requiring the animal to perform one or more tasks. The enrichment devices often take time to fill, requiring the owner or handler to insert food into small spaces or into multiple compartments. One example of an enrichment product involves a ball filled with food that is placed into a tube. The animal must reach into the tube and move the ball to release food from an opening in the ball. The ball remains captive in the tube and may be removed and refilled as needed by a caretaker of the animal. Refilling the device requires that the ball be unsecured, removed from the device tube, refilled, placed back into the tube, and then finally re-secured within the tube. Another example of an enrichment device is a bowl having protrusions, such as posts or grooves provided in the bottom surface. The food is placed into the bowl and occupies the grooves, or, in the case of an obstruction, such as a post, fills in around the post. The pet must move the food around the obstruction or post in order for the food to be accessible to the pet for consumption. In the case of the grooved device, grooves are formed which lead to spaces or terminations in which the food may pool or pile up for ease of access, so that the animal is encouraged to move the food along the groove to a location at which the animal may pick up the food.

Other stimulations include stimulation of the olfactory senses, which, for canines, involves the senses of smell and taste. For example, snuffling is the act of breathing noisily through the nose, which may be due to something such as a cold or crying. However, in terms of animals, snuffling is described as the making of repeated sniffing sounds as though smelling at something. There is a snuffelmat which is a mat with a rubber backing to which strips of felt are tied. Food or treats are inserted between fleece strips. The pet is provided with the mat and uses its nose and sense of smell to locate the food. Upon locating the food, the pet may consume the food or treat located, and, if there is food or treats remaining, it may continue the process to locate other items of food or treats.

A need exists for an improved product that will provide engagement of the animal, such as a dog, with activity that stimulates the olfactory senses, that may be used to distribute food and treats, and which may be cleaned and reused.

As mentioned, animals when not engaged will often become bored. Domestic animals are typically kept in an environment which is the same day in and day out. Although dogs may be taken for a walk, a dog in the home, even if taken for an hour walk per day, may not have the stimulation that it needs. In addition, a number of dogs, such as for example, police service dogs and dogs kept in shelters, are often confined to cages for extended periods of time. These animals become bored, and often there is little or no stimulation for the animal. When animals are young, particularly dogs at the puppy stage, they typically will occupy themselves with a variety of activities, some of which may be destructive to the environment around them. The young canine may chew on furniture, rip pillows, or damage shoes and other household articles. Aside from the damage done to the articles, this behavior also may be hazardous to the pet. When the pet is occupied with another activity, such as eating or playing with an appropriate toy, then the pet is less likely to engage in destruction or harmful conduct. In addition, dogs that may be confined to a cage or other area also may benefit from engaging in a stimulating activity.

SUMMARY OF THE INVENTION

A stimulation device is provided which is designed to stimulate the olfactory senses of an animal, such as, for example, a dog. According to preferred embodiments, the stimulation device is configured in the form of a mat which entraps a consumable material therein, such as, food and/or treats for the animal, and engages the animal to rely on olfactory senses to locate the hidden food or treats. The device is designed to reduce the potential for boredom, and provides an activity outlet for the animal.

According to preferred embodiments, the stimulation device is configured as a mat having a pile. The pile may be made up of a plurality of fingers that are secured to the base. The base and the pile thereon preferably are constructed from a fiber based material, such as, for example, a fabric fiber. Cotton is one example of a fiber that may be used to form the base and pile. Other examples include other fabrics, and preferably those that may be washed in a typical residential or commercial washer, and may be air dried or placed in a dryer.

Preferred embodiments are configured to provide an upstanding or substantially upstanding pile configuration, which forms a number of capture spaces into which the food or treats for an animal may reside when the food or treat is placed on the mat. The pile configuration and elements may be constructed to be rigid so that a number of cavities are formed, while at the same time, the pile elements are movable, so that the animal may rummage through the mat pile to locate food or treats.

The mat preferably is constructed from a material that is usable and holds up in the presence of moisture. For example, where the mat becomes wet, e.g., with fluids of the animal, such as, for example, saliva or other fluids, the pile constituency preferably remains secure and resistant to the moisture or other fluids. According to some preferred embodiments, the pile elements comprise fingers constructed from a fabric. According to some embodiments, the fabric is a woven fabric, and according to some embodiments, the fingers are constructed from fabric that is resilient and may be stretchable. For example, the stretchable fabric may provide the fingers with the ability to stretch in the event that the fingers are inadvertently attempted to be withdrawn with an item of food or a treat, or while the animal is locating or extracting the food from the mat. Embodiments of the mat may include fingers formed from a woven fabric that is stretchable and resilient, so that it may be stretched and returned to its unstretched condition (e.g., once the animal is no longer exerting a force on the fingers).

BRIEF DESCRIPTION OF THE DRAWING FIGURES

DETAILED DESCRIPTION OF THE INVENTION

Figure 1:
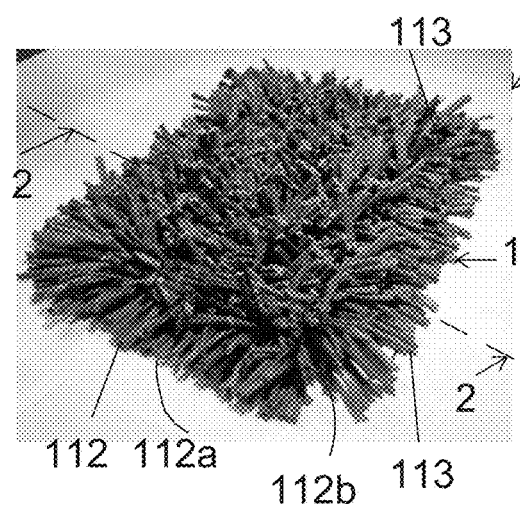
FIG. 1 is a perspective view of a stimulation device according to the invention, configured as a mat.

Referring to FIGS. 1 to 9B and 11, an exemplary embodiment of a stimulation mat 110 for an animal is illustrated. The mat 110 is shown having a base 112 with a pile surface 111. The pile surface 111 is formed from a plurality of elements 113 which are arranged on the base 112. According to a preferred embodiment, the elements 113 comprise fingers that preferably extend away from the base 112, and preferably upward from the base 112.

According to a preferred embodiment, the base 112 is constructed from a fabric material, and has a bottom surface 112a and top surface 112b. In the arrangement illustrated, the fingers 113 are attached to the base 112. According to a preferred embodiment, the fingers 113 are attached to the top surface 112b of the base 112. In the illustration of the exemplary embodiment of the mat 110, the bottom surface 112a is shown as a substantially flat surface. According to some preferred embodiments, the base 112 preferably is constructed from a washable material, and may be constructed from a washable fabric.

According to some embodiments, the fingers 113 preferably are provided and arranged with a density to have a suitable weight to offer some resistance to the animal as it snuffles through the fingers 113 to locate the captured food within the cavities. As illustrated in the sectional view of FIG. 2, a plurality of cavities 130 are formed in the arrangement of fingers 113. According to some preferred embodiments, the fingers 113 are provided to cover or substantially cover the base top surface 112b so that food or treats may be hidden within or among the fingers 113. Preferred embodiments may provide a suitable number of fingers 113, which are sized and spaced to permit food or treats placed on the pile surface 111 of the mat 110 to work their way down into the pile (either when placed thereon, or with some agitation by an individual, such as brushing a hand over the pile surface 111).

According to some embodiments, the fingers 113 may be stretchable. The fingers 113 may be formed from an elastic material to provide elasticity, so the fingers 113 may be stretched (or when stretched), provide the ability to give, and when released, the fingers 113 may retract and return to their unstretched condition. For example, where an animal locates the food and attempts to retrieve the food from the mat 110, and inadvertently attempts to do so along with one or more of the fingers 113, the fingers 113 may stretch and give so as to lessen the initial force from the pulling, as well as potentially to indicate to the animal that there is resistance (e.g., of the finger but not the food or treat). The animal may therefore retrieve the food (or continue to retrieve the food) and lessen the force being applied to the fingers 113. In other instances, the animal may retrieve the food without also capturing any of the fingers 113.

As illustrated in FIGS. 1-9B and 11, the washable, reusable mat 110 serves as a stimulation device for animals. The mat 110 base 112 has a pile surface 111 which, according to the embodiment illustrated, is formed from a plurality of fingers 113 that are arranged to form a plurality of spaces (see e.g., the spaces 130, FIG. 2) within the pile 111. The fingers 113 preferably form the structure of the pile 111. Food or treats for the animal (e.g., a dog), are placed on the mat 110 (see FIG. 2), and the food or treats fall among the fingers 113 and are captured within the spaces 130 (FIG. 2) formed in the pile 111 by the fingers 113. The animal locates the food or treats by employing the animal's olfactory senses, such as smell and taste, to locate the food within the mat pile 111. The animal may use its body, such as its nose (or paws), to gain access to the captured food by tunneling among the fingers 113, moving the fingers 113 aside, or undertaking some other action to expose or access the hidden food.

Figure 2:
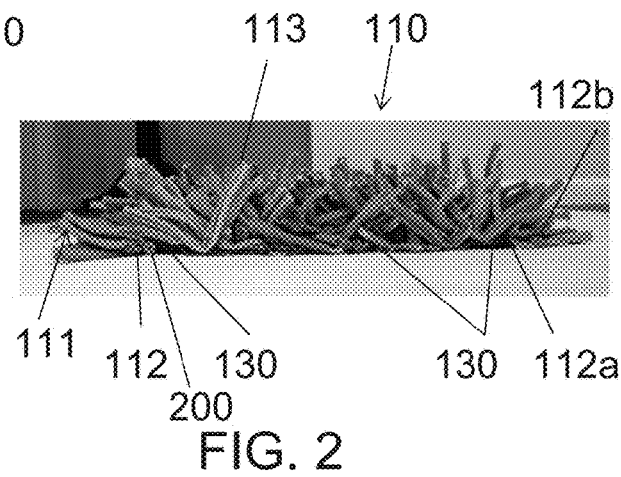
FIG. 2 is a sectional view of the mat of FIG. 1, taken along the section line 2-2 of FIG. 1.
Figure 3:
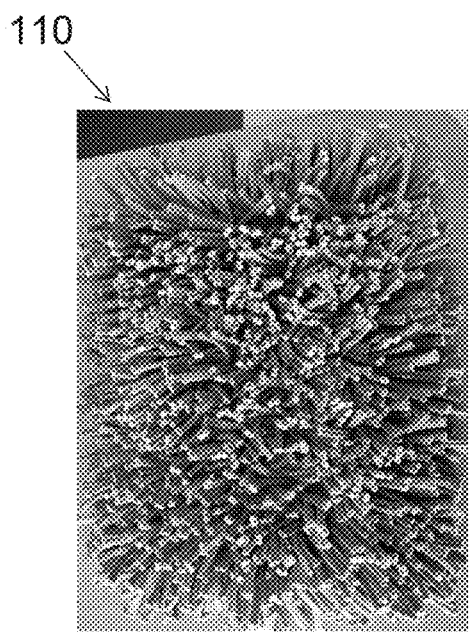
FIG. 3 is a top plan view of the met.
Figure 4:
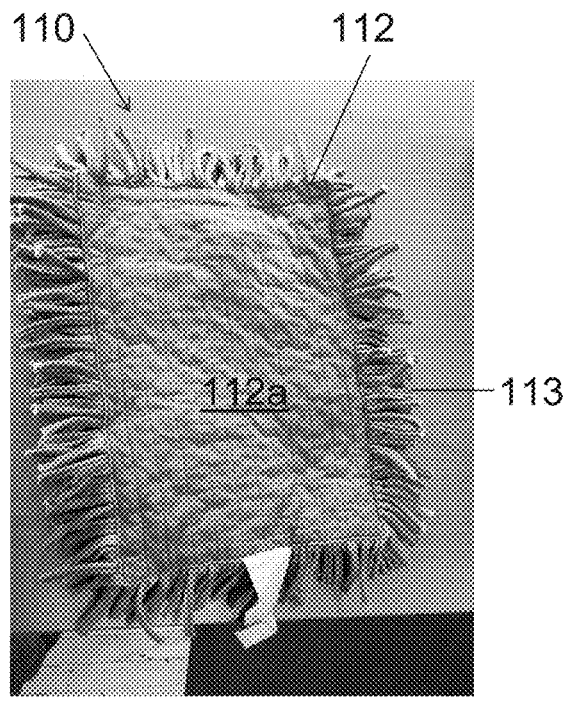
FIG. 4 is a bottom plan view of the mat.
Figure 5:
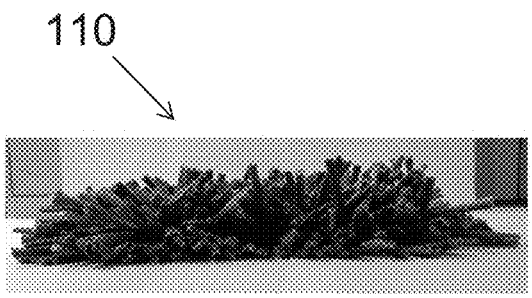
FIG. 5 is a right side elevation view thereof.
Figure 7:
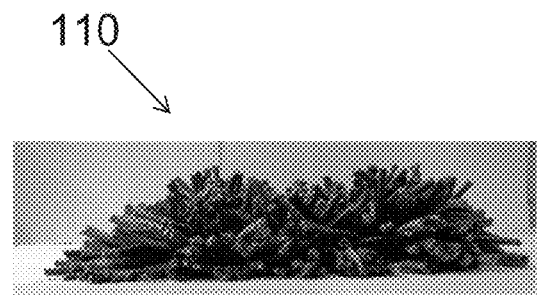
FIG. 7 is a left side elevation view thereof.
Figure 6:
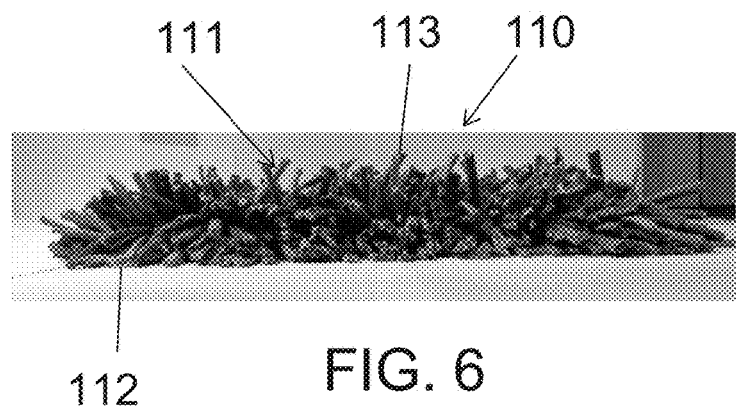
FIG. 6 is a front elevation view thereof.
Figure 8:
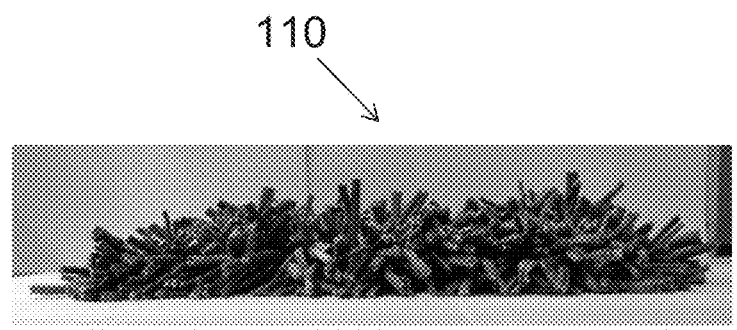
FIG. 8 is a rear elevation view thereof.
Figure 9A:
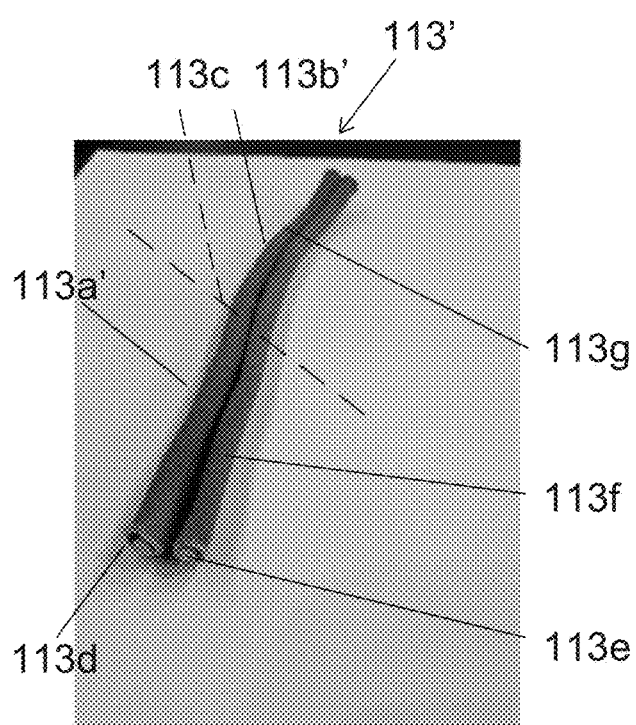
FIG. 9A is an exemplary embodiment of a finger used to form the pile.
Figure 9B:
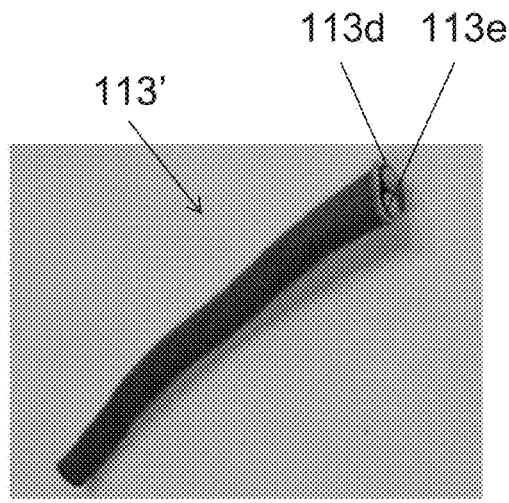
FIG. 9B is a perspective view of the finger of 9A shown from an alternate position.

A finger 113 may be formed from a sheet which may be layered, folded or otherwise secured onto itself, to provide suitable rigidity for the pile surface 111. According to one embodiment, the fingers 113 comprise structures, such as the finger 113' (separately shown in FIGS. 9A and 9B) and may have a first end 113a' and a second end 113b' (see FIG. 9A). According to one preferred arrangement, the fingers 113 are secured to the base 112 at a location between the first end 113a' and the second end 113b'. The finger arrangement illustrated in conjunction with the mat 110 secures the fingers 113, by taking the finger 113' and attaching it at its central location 113c' to the base 112. According to a preferred embodiment, the finger 113' preferably may be attached to the base upper surface 112b (FIGS. 1 and 2). The finger 113', when attached to the base 112 provides a first finger 113 formed from the first end 113a' that extends from the base 111 and a second finger 113 that is formed from the second end 113b' that extends from the base 112. According to this exemplary embodiment, the finger 113' therefore forms two fingers 113 of the pile 111 when attached to the base 112. In the exemplary embodiment illustrated, a plurality of fingers 113' are attached to the base 112 to form the mat fingers 113 that comprise the pile 111.

As illustrated in the figures, the fingers 113 interfere with each other and may engage each other to form a plurality of finger ends, and to provide capturing spaces 130 (see FIG. 2) between the fingers 113 and the base 112, or between other fingers 113. Consumable items, such as the animal's food or treats 200 are captured between the fingers 113, and preferably within spaces, such as, for example, the spaces 130 depicted in FIG. 2, such as the spaces in the pile 111 formed between the fingers 113, and/or spaces formed between the fingers 113 and the base 111.

The fingers 113 preferably are configured to be substantially raised in relation to the base 111. The base 111 illustrated in the exemplary embodiment is depicted comprising a flat base, from which the fingers 113 are angled or upwardly raised from the base 111. The fingers 113 preferably are configured with some rigidity to form the pile 111 and provide a plurality of spaces therebetween for the food or treats not only to reside in the cavities 130, but also to facilitate the passing of the food or treats through and among the fingers 113 and to pass into the cavities 130. The density of the fingers 113 forming the pile 111 preferably are arranged so that one or more fingers 113 may support other fingers 113.

According to a preferred embodiment, the fingers 113 are configured having a spindle shape. As illustrated in the figures, according to preferred embodiments, the fingers 113 may be constructed having a wall that has a cylindrical or cylindrical-like configuration. For example, the fingers 113 may be configured by providing a rolled structure. For example, the fingers 113 may be configured having walls that are free of external edges. In the exemplary depiction in FIGS. 9A and 9B, the finger 113' is shown having inturned edges 113d, 113e. The finger 113 is shown having a first portion 113f and second portion 113g, which span the length of the finger 113'. In the exemplary embodiment illustrated, the first finger portion 113f comprises a first rolled portion of the finger material, and the second finger portion 113g comprises a second rolled portion of the finger material. In the embodiment illustrated, for example, the finger portions 113f, 113g may be formed at opposite sides of the finger 113' (e.g., see the arranged fingers shown attached as part of the mat 110). According to some embodiments, the fingers 113 may comprise substantially cylindrical elements, and may have at least an arcuate portion. The fingers 113 may be formed from a rolled sheet of material, and the rolled sheet of material may be rolled at at least one end thereof, and according to some embodiments, may be rolled at each end thereof (see FIGS. 9A and 9B).

Various materials may be used to form the mat base 112 and fingers 113. Any suitable material may be used to form the base 112 and fingers 113. The mat 110, including the fingers 113 and base 112, preferably is formed from a washable material. The fingers 113 and base 112 may be formed from the same material or from different materials. For example, the base 112 may comprise a fabric and the pile 111 formed by the fingers 113 also may be constructed from fabric.

According to some preferred embodiments, the fingers 113 may be provided to extend at a substantially similar distance from said base. For example, as discussed, the fingers 113 may be attached to the base 112 at a finger midpoint (see e.g., the midpoint 113c of FIG. 9A) to provide two equal finger length portions (e.g., from the finger 113', FIGS. 9A and 9B). According to some embodiments, the fingers 113 may be attached to the base 112 in rows. Preferably, the fingers 113 are arranged in a spaced relationship to provide coverage over the mat 110 or base surface 112b. The finger midpoints may be arranged adjacently on the base 112 and secured to the base 112. For example, the midpoints of adjacently arranged fingers 113 may be secured to the base 112 by connecting the adjacently arranged row of forgers 113 at their respective midpoints with a row of a fastening element, which may be threads (stitching), adhesive, or other suitable attachment means or material. The fingers 113 may be contiguous at their respective attachment locations on the base 112, or may be non-contiguous at the attachment locations, or combinations of these.

According to some preferred embodiments, the fingers 113 are configured so that in the case where the fingers 113 are disrupted by the animal seeking to locate a consumable item within the mat 110, the fingers 113 may be moved (e.g., moved aside). Preferably, the fingers 113 do not deform or collapse onto themselves.

Figure 10A:
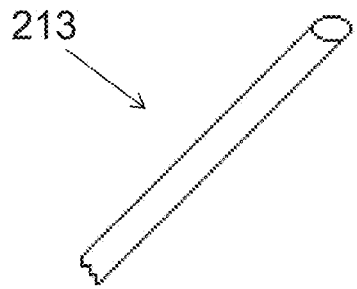
FIG. 10A is an alternate embodiment of another finger.
Figure 10B:
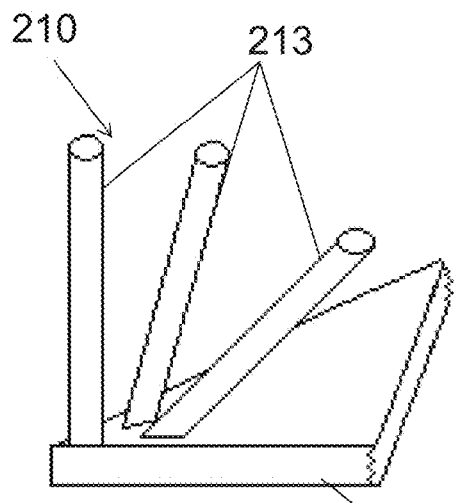
FIG. 10B is an alternate embodiment of a mat with the fingers of FIG. 10A (with only a portion of the fingers shown on a portion of the mat).
Figure 11:
FIG. 11 is perspective view of the mat of FIG. 1, shown in part, and with a dog engaged in extracting food from the mat.

An alternate embodiment of a finger 213 is illustrated in FIGS. 10A and 10B, and shows a generally columnar configuration. FIG. 10B shows a partial view of a section of a mat 210 with fingers 213 shown. The mat 210 is shown for exemplary purposes and more fingers 213 preferably would be provided on the base 212. The finger 213 may be a solid structure, and may be connected with, or formed with a supporting base 212 (e.g., as a unitary structure), and may be washable, including placement in a dishwasher. The alternative embodiment finger 213 and base structure 212 may be made from suitable material.

These and other advantages may be obtained through the use of the inventive apparatus and methods disclosed herein. While the invention has been described with reference to specific embodiments, the description is illustrative and is not to be construed as limiting the scope of the invention. For example, although the mats 110, 210 and bases 112, 212 are depicted as a substantially rectangular structure (or corner in the case of mat 210), the mats according to the invention may be provided having a variety of shapes, such as, for example, a dog bone, circle, square, or other desired shape. The mats 110, 210 preferably are constructed from materials or components that provide safety for the animal, should the animal decide to overturn or raise the mat into the air. In addition, according to some embodiments, the pile or fingers may be constructed to facilitate washing and cleaning by limiting closed spaces of the finger, so that trapped debris may be extracted or expunged. Various modifications and changes may occur to those skilled in the art without departing from the spirit and scope of the invention described herein and as set forth in the appended claims.

What is claimed is:

1. A stimulation device for animals comprising:
   a base formed from a fabric material and having a top surface and a bottom surface;
   a plurality of fingers attached to the top surface of the base to form a pile surface, each of the fingers being formed from a sheet of fabric comprising a first end, a second end, a longitudinal axis extending from the first end to the second end, a first side edge extending between the first and second ends, and a second side edge extending between the first and second ends, the sheet of fabric being rolled into a scroll shape such that the first side edge is rolled towards the longitudinal axis to form a first rolled portion of the finger and the second side edge is rolled towards the longitudinal axis to form a second rolled portion of the finger; and wherein each of the fingers is independently attached to the top surface of the base at a connection location of the finger that is positioned between the first and second ends so that first and second elongated portions of the finger on opposite sides of the connection location both extend from the top surface of the base.

2. The device of claim 1, wherein the fingers are stitched to the top surface of the base with threads, and wherein the base is devoid of any openings through which the fingers extend.

3. The device of claim 1, wherein the fingers are arranged in a plurality of rows along the top surface of the base, and wherein each row of the fingers is attached to the base with a row of stitching.

4. The device of claim 3, wherein adjacent rows of the stitching are spaced apart from one another along the base so that spaces are formed in the pile surface between the rows of the fingers.

5. The device of claim 1, wherein the fingers are arranged and oriented to entirely cover the top surface of the base so that no portion of the top surface of the base is visible without distorting the fingers.

6. The device of claim 1, wherein the first rolled portion of the finger is located on a first side of the longitudinal axis and the second rolled portion of the finger is located on a second side of the longitudinal axis, and wherein an outer surface of the first rolled portion faces an outer surface of the second roiled portion.

7. The device of claim 1, wherein each of the fingers comprises a first major surface and a second major surface opposite the first major surface, and wherein each of the first and second rolled portions are rolled along the same one of the first and second major surfaces.

8. The device of claim 1, wherein the fingers are attached to the top surface of the base in rows, and wherein adjacent fingers in each row are contiguous.

9. The device of claim 1, wherein the fingers extend from the base in a variety of different angles.

10. The device of claim 1, wherein said base and said fingers are constructed from a washable material.

11. The device of claim 1, wherein midpoints of adjacently arranged fingers are secured to the base in rows by connecting the midpoints of the adjacently arranged fingers within a row to the base with a fastening element.

12. The device of claim 11, wherein the fastening element comprises stitching.

13. The device of claim 1, wherein said fingers are formed from a stretchable fabric.

14. The device of claim 1, wherein the base comprises a peripheral edge extending between the top and bottom surfaces, and wherein a subset of the plurality of fingers located along a periphery of the top surface of the base extend beyond the peripheral edge of the base.

15. The device of claim 1, wherein a plurality of capturing spaces are formed between the fingers.

16. The device of claim 15, wherein the fingers are arranged on the base in a spaced relation to form the plurality of capturing spaces.

17. The device of claim 1, wherein the fingers are attached to the base and are provided entirely on the top surface, and wherein the bottom surface of the base comprises a substantially flat surface.

18. A mat for feeding an animal comprising:
a base having a top surface and a bottom surface;
a plurality of fingers attached to the top surface of the base, at least one of the fingers being rolled into a scroll shape comprising a first rolled portion and a second rolled portion; and
wherein each of the fingers is independently attached to the top surface of the base at a connection location of the finger so that first and second elongated portions of the finger on opposite sides of the connection location both extend from the top surface of the base.

19. The mat according to claim 18 wherein an entirety of each of the fingers is located adjacent to the top surface of the base.

20. The mat according to claim 18 wherein each of the fingers is rolled into the scroll shape, each of the fingers comprising a first end, a second end, a first side edge, and a second side edge, and wherein the first side edge is rolled towards the second side edge to form the first rolled portion and the second side edge is rolled towards the first side edge to form the second rolled portion, the first and second rolled portions being adjacent to one another.

21. The mat according to claim 18 wherein each of the fingers is rolled into the scroll shape, each of the fingers comprising a first end, a second end, and a longitudinal axis that extends from the first end to the second end, wherein the first and second rolled portions extend from the first end to the second end, and wherein the first rolled portion is located on a first side of the longitudinal axis and the second rolled portion is located on a second side of the longitudinal axis.

22. The mat according to claim 18 wherein no portion of any of the fingers extends through the base.

* * * * *